United States Patent
Kim et al.

(10) Patent No.: US 10,200,450 B2
(45) Date of Patent: Feb. 5, 2019

(54) DATA SHARING APPARATUS AND METHOD OF MOBILE TERMINAL

(71) Applicant: Samsung Electronics Co., Ltd., Suwon-si, Gyeonggi-do (KR)

(72) Inventors: Dohyoung Kim, Seoul (KR); Minkyung Kim, Seoul (KR); Wansoo Lim, Seongnam-si (KR); Youngmi Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/435,594

(22) Filed: Feb. 17, 2017

(65) Prior Publication Data

US 2017/0163717 A1    Jun. 8, 2017

Related U.S. Application Data

(63) Continuation of application No. 13/765,021, filed on Feb. 12, 2013, now Pat. No. 9,584,623.

(30) Foreign Application Priority Data

Feb. 24, 2012   (KR) .................. 10-2012-0019093

(51) Int. Cl.
*G06F 15/16* (2006.01)
*H04L 29/08* (2006.01)
(Continued)

(52) U.S. Cl.
CPC ............ *H04L 67/06* (2013.01); *G06F 3/0482* (2013.01); *G06F 3/04845* (2013.01);
(Continued)

(58) Field of Classification Search
CPC .......... H04N 21/8153; G06F 17/30905; G06F 17/30206; G06F 17/30575; G06F 3/0482;
(Continued)

(56) References Cited

U.S. PATENT DOCUMENTS

2004/0215625 A1* 10/2004 Svendsen .......... G06F 17/30206
2005/0117884 A1   6/2005 Kang et al.
(Continued)

FOREIGN PATENT DOCUMENTS

CN    1728144 A    2/2006
CN    1777261 A    5/2006
(Continued)

OTHER PUBLICATIONS

Korean Office Action with English translation dated Nov. 30, 2018; Korean Appln. No. 10-2012-0019093.

*Primary Examiner* — Jungwon Chang
(74) *Attorney, Agent, or Firm* — Jefferson IP Law, LLP

(57) ABSTRACT

An apparatus and method for sharing data between a cloud server and at last one terminal are provided. The method includes displaying, when a data type is selected on a setting menu screen of a cloud service, meta information of real data corresponding to the selected data type, the meta information being downloaded from a server, downloading, when a piece of meta information is selected, the real data corresponding to the selected piece of meta information from the server, and deleting, when the downloaded real data is consumed completely, the consumed real data.

12 Claims, 17 Drawing Sheets

(51) Int. Cl.
    *G06F 3/0482*    (2013.01)
    *G06F 17/30*     (2006.01)
    *G06F 3/0484*    (2013.01)
(52) U.S. Cl.
    CPC ........ *G06F 17/30203* (2013.01); *H04L 67/10* (2013.01); *H04L 67/1095* (2013.01); *H04L 67/2804* (2013.01); *H04L 67/2852* (2013.01); *H04L 67/2857* (2013.01); *H04L 67/32* (2013.01); *G06F 3/0484* (2013.01); *H04L 67/02* (2013.01); *H04L 67/1074* (2013.01); *Y10S 345/902* (2013.01)
(58) Field of Classification Search
    CPC ............... G06F 3/0484; G06F 3/04845; G06F 17/30203; H04L 67/22; H04L 67/02; H04L 67/06; H04L 67/10; H04L 67/2804; H04L 67/32; H04L 67/1095; H04L 67/2852; H04L 67/2857; H04L 67/1074; Y10S 345/902
    USPC ........... 715/234; 725/91; 709/217, 219, 224, 709/206; 707/634
    See application file for complete search history.

(56) References Cited

U.S. PATENT DOCUMENTS

| | | |
|---|---|---|
| 2006/0026182 A1 | 2/2006 | Takeda et al. |
| 2006/0104605 A1 | 5/2006 | Park et al. |
| 2008/0178234 A1* | 7/2008 | Eyal .................. H04N 21/8153 725/91 |
| 2009/0271696 A1 | 10/2009 | Bailor et al. |
| 2010/0198944 A1* | 8/2010 | Ho ....................... H04L 12/189 709/217 |
| 2010/0287219 A1 | 11/2010 | Caso et al. |
| 2011/0087726 A1 | 4/2011 | Shim et al. |
| 2011/0106965 A1 | 5/2011 | Chun et al. |
| 2011/0173337 A1* | 7/2011 | Walsh .................. H04W 4/023 709/229 |
| 2011/0205435 A1 | 8/2011 | Lee et al. |
| 2012/0002952 A1 | 1/2012 | Anderson |
| 2012/0179653 A1* | 7/2012 | Araki ................ G06F 17/30575 707/634 |
| 2012/0221654 A1 | 8/2012 | Park |
| 2013/0031459 A1* | 1/2013 | Khorashadi ....... G06F 17/30905 715/234 |
| 2013/0227035 A1 | 8/2013 | Lim et al. |
| 2013/0282790 A1* | 10/2013 | Catmull ............ G06F 17/30194 709/203 |
| 2014/0047350 A1 | 2/2014 | Kim et al. |

FOREIGN PATENT DOCUMENTS

| | | |
|---|---|---|
| CN | 1875420 A | 12/2006 |
| CN | 102055787 A | 5/2011 |
| EP | 1 624 688 A1 | 2/2006 |
| EP | 1 624 688 B1 | 6/2009 |
| JP | 2006-048146 A | 2/2006 |
| KR | 10-2006-0009049 A | 1/2006 |

* cited by examiner

FIG. 3B

| Meta only | on/off |
|---|---|
| MUSIC | on/off |
| VIDEO | on/off |
| PICTURE | on/off |
| DOCUMENT | on/off |
| ⋮ | |

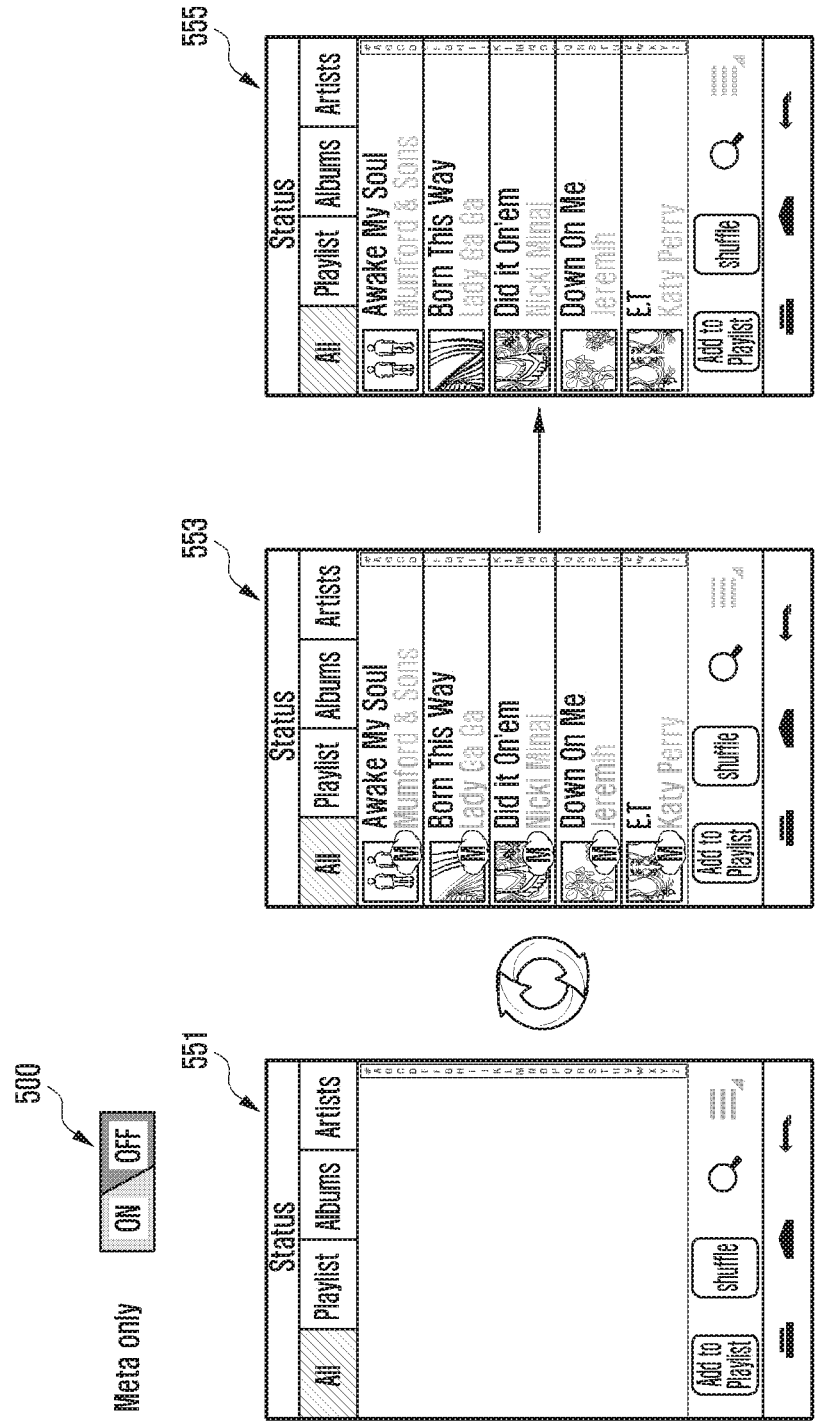

DATA SHARING APPARATUS AND METHOD OF MOBILE TERMINAL

CROSS-REFERENCE TO RELATED APPLICATION(S)

This application is a continuation application of prior application Ser. No. 13/765,021, filed on Feb. 12, 2013, which will issue as U.S. Pat. No. 9,584,623 on Feb. 28, 2017 and claimed the benefit under 35 U.S.C. § 119(a) of a Korean patent application filed on Feb. 24, 2012 in the Korean Intellectual Property Office and assigned Serial number 10-2012-0019093, the entire disclosure of which is hereby incorporated by reference.

BACKGROUND OF THE INVENTION

1. Field of the Invention

The present invention relates to a data sharing apparatus and method of a mobile terminal. More particularly, the present invention relates to an apparatus and method for sharing the data between a cloud server and at least one terminal.

2. Description of the Related Art

Typically, the terminal device such as mobile terminal is a portable device carried by a user to provide various functions including mobile communication function. The mobile terminal can be any of mobile phone, tablet PC, laptop computer, MP3 player, and the like. The mobile terminal is capable of being equipped with various functions such as communication, camera, Internet access, video playback, broadcast reception, and the like. However, for mobile terminals designed with portability as one of the most significant factors as a design consideration is limited in memory capacity. In order to overcome the memory limitation, various researches are being conducted. One of the solutions is the cloud service.

The cloud service is a means to upload the contents such as movies, pictures, music and other media files, phonebook, and the like to a server and download any of them, whenever it is necessary, using a portable terminal equipped with the communication function. In the case of using the cloud service by means of the portable terminal, the aforementioned memory shortage problem may occurs while storing the downloaded data. There is therefore a need of a method of collaboration between the portable terminal and the server to manage the saved contents efficiently.

Therefore, a need exists for an apparatus, system and method for sharing the data between a cloud server and at least one terminal. Furthermore, a need exists for an apparatus, system, and method that is capable of synchronizing the data shared between a portable terminal and a server using metadata.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a data sharing apparatus and method that is capable of synchronizing the data shared between a portable terminal and a server using metadata.

Another aspect of the present invention is to provide a data sharing apparatus and method that is capable of managing the contents shared between a portable terminal and a server with meta-information of the contents efficiently in such a way that, if the piece of meta-information is selected, the portable terminal downloads the data represented by the piece of meta-information to consume and then discards the consumed data immediately.

Another aspect of the present invention is to provide a data sharing apparatus and method that is capable of managing the contents shared between a portable terminal and a server efficiently in such a way that the portable terminal analyzes residual memory space, when a piece of meta-information is selected to download the corresponding data, and consumes and stores, if the residual memory space is enough to store the data, and, otherwise, consumes and discards the data immediately.

In accordance with an aspect of the present invention, a data sharing method of a terminal is provided. The data sharing method includes displaying, when a data type is selected on a setting menu screen of a cloud service, meta information of real data corresponding to the selected data type, the meta information being downloaded from a server; downloading, when a piece of meta information is selected, the real data corresponding to the selected piece of meta information from the server; and deleting, when the downloaded real data is consumed completely, the consumed real data.

In accordance with another aspect of the present invention, a data sharing method of a terminal is provided. The data sharing method includes configuring data types and a meta information mode for use in a cloud service; operating, when the meta information mode is set to a meta only on mode, in the meta only on mode, and operating, when the meta information mode is set to a meta only off mode, in the meta only off mode, wherein operating in the meta only on mode comprises displaying, when the meta information mode is set to a meta only on mode, meta information corresponding to data corresponding to a selected data type, downloading, when a piece of meta information is selected, the data corresponding to the selected piece of meta information from a server, and deleting the downloaded data after being consumed, and operating in the meta only off mode comprises displaying, when the meta information mode is set to a meta only off mode, the meta information corresponding to the data corresponding to the selected data type, downloading, when a piece of meta information is selected, the data corresponding to the selected meta information from the server, and storing the downloaded data after being consumed.

In accordance with still another aspect of the present invention, a data sharing method of a terminal is provided. The data sharing method includes downloading and storing meta information of data corresponding to a selected data type for cloud service from a server in an initial synchronization process, displaying, when the data type is selected, the meta information of the data corresponding to the selected data type, analyzing, when a piece of the meta information is selected, used memory space, switching, when the used memory space is greater than a threshold value, from a meta only off mode to a meta only on mode to process the data in the meta only on mode, and maintaining, when the used memory space is equal to or less than the threshold value, the meta only off mode to process the data in the meta only off mode, wherein the meta only off mode synchronizes both the meta information and the corresponding data with copies saved in the server while the meta only on mode synchronizes only the meta information with copies saved in the server, the data corresponding to the meta information being processed in a cache memory and then deleted in the meta only on mode.

In accordance with still another aspect of the present invention, a terminal for sharing data with a server is provided. The terminal includes a communication unit which communicates data and meta information representing the data with the server through an Internet Protocol (IP) network, a memory having a cache region for storing the data temporarily and a cloud region for storing cloud data, an input unit which receives an input for setting a meta information mode to a meta only on mode or a meta only off mode, a display unit which displays the cloud data in one of the meta only on mode and the meta only off mode, and a control unit which controls the terminal in the meta only on mode to display, when the meta information mode is set to a meta only on mode, meta information corresponding to data corresponding to a selected data type, to download, when a piece of meta information is selected, the data corresponding to the selected piece of meta information from a server, and to delete the downloaded data after being consumed, and which controls the terminal in the meta only off mode to display, when the meta information mode is set to a meta only off mode, the meta information corresponding to the data corresponding to the selected data type, to download, when a piece of meta information is selected, the data corresponding to the selected piece of meta information from the server, and store the downloaded data after being consumed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 3A and 3B are diagrams illustrating screens for configuring data synchronization for use in data synchronization between a terminal and a server according to an exemplary embodiment of the present invention;

FIGS. 5A and 5B are diagrams illustrating exemplary screens displayed in a meta only off mode of a terminal according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
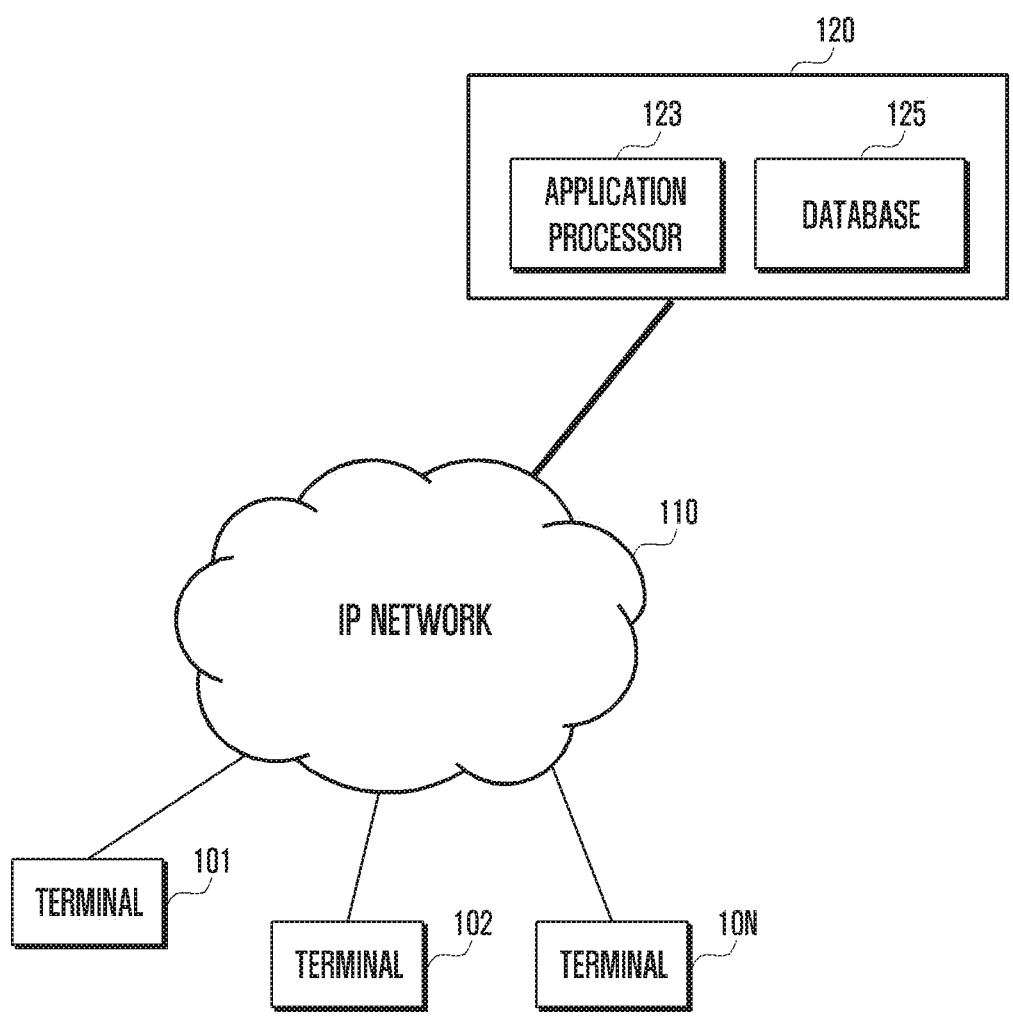
FIG. 1 is a diagram illustrating the architecture of a cloud service system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, numerous specific details are provided, such as memory utilization, to provide a thorough understanding of exemplary embodiments of the present invention. One skilled in the relevant art will recognize, however, that an exemplary embodiment of the present invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of exemplary embodiments of the present invention.

Exemplary embodiments of the present invention use meta-information in the cloud data sync method to provide the server and the terminal with the same view. According to an exemplary embodiment of the present invention, the cloud data sync method is provided with a meta only on mode and a meta only off mode. Here, the meta-information is the information about certain data. As an example, the meta-information includes only the basic information such as thumbnail and data name about certain data. The term 'data' (hereinafter, referred to as real data) denotes the object represented by the meta-information. Here, the meta only on mode is the operation mode in which the portable terminal has only the meta-information synchronized with the copies stored in the server and downloads the real data represented by the meta-information selected in the portable terminal from the server, the downloaded real data being consumed and discarded. The meta only off mode is the operation mode in which the portable terminal has the meta-information synchronized with the copies stored in the server and analyzes the residual memory space, when a piece of meta information is selected, to store, if the residual memory space is enough, the downloaded real data and, otherwise, transition to the meta only on mode. According to an exemplary embodiment of the present invention, the meta information processed in the meta only on mode is expressed in the form of an icon indicating that only the meta information exists (hereinafter, referred to as meta only on mode icon).

FIG. 1 is a diagram illustrating the architecture of a cloud service system according to an exemplary embodiment of the present invention.

Referring to FIG. 1, the terminals 101, 102, and 10N connect to the server 120 through the Internet 110. Here, each of the terminals 101, 102, and 10N can be any of a mobile phone, a tablet Personal Computer (PC), a laptop computer, an MP3 player, and the like. The server 120 includes an application processor 123 for processing various types of contents and a database 125 for storing meta information of the contents and the real data represented by the meta information.

The above-structured cloud service system has been evolved to the current platform service. Unlike the conventional personal cloud service providing storage space in the form of the conventional web hard, the recent cloud service has been upgraded as a platform service capable of supporting various types of software applications. The cloud service system is capable of supporting the applications through the cooperation among the telecommunication carriers and application service providers. For example, a client is capable of working with documents by means of a smartphone or tablet PC as well as desktop PC at office or home without extra software installation. This means that the software with which the user has work can be used in another PC, portable terminal operating on the android, iOS platform, or the like, tablet PC, or laptop computer only by downloading the corresponding document application without installation. With the diversification of such applications, the cloud service system is also evolving to process the application data, especially the entertainment data such as movie, game, document, music, picture files, and the like.

In the case of interoperating with the service based on the Digital Living Network Alliance converging wired and wireless communications, this make it possible to transmit and share the contents through a home network. For example, the cloud service can be used for sharing contents stored in the cloud storage among the devices connected through wired and wireless links.

Figure 2:
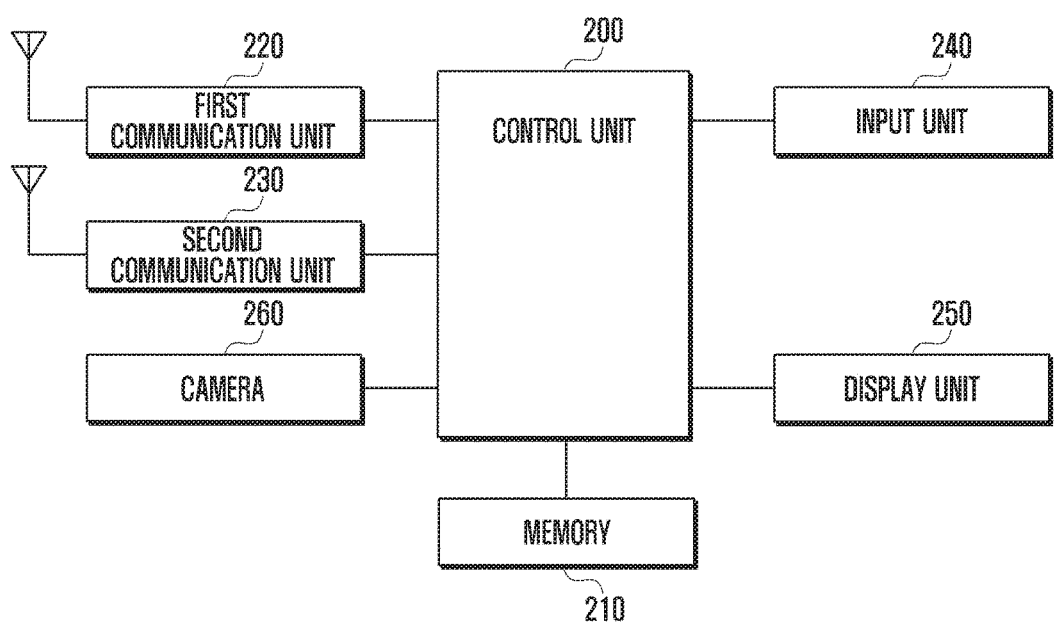
FIG. 2 is a block diagram illustrating a configuration of a terminal according to an exemplary embodiment of the present invention.

FIG. 2 is a block diagram illustrating a configuration of a terminal according to an exemplary embodiment of the present invention. As an example, the terminal can be one of the terminals 101, 102, and 10N illustrated in FIG. 1, and FIG. 2 is directed to the case in which the terminal is a mobile phone.

Referring to FIG. 2, the first communication unit 220 and the second communication unit 230 are responsible for radio communication of the terminal in the communication network. As an example, the communication network can be a cellular communication network or an Internet Protocol (IP) communication network. Each of the first and second communication units 220 and 230 may include a transmitter having a frequency up converter for up-converting a baseband signal to a Radio Frequency (RF) band signal and a power amplifier and a receiver having a low noise amplifier for low noise amplifying the received RF signal and a frequency down converter for down converting the RF signal to a baseband signal. Each of the first and second communication units 220 and 230 may also include a modulator for modulating the transmission signal and delivering the modulated signal to the transmitter and a demodulator for demodulating the signal output by the receiver. As an example, the modulator/demodulator may modulate/demodulate Wideband Code Division Multiple Access (WCDMA), Code Division Multiple Access (CDMA), Global System for Mobile Communications (GSM), Long Term Evolution (LTE), WiFi, Wireless Broadband (WiBro), or Worldwide Interoperability for Microwave Access (Wi-Max) signal, and/or the like.

The control unit 200 controls overall operations of the terminal and data communication in connection with a communication network by means of the first and second communication units 220 and 230 according to an exemplary embodiment of the present invention.

The memory 210 can be divided into a program memory for storing the Operating System (OS) of the terminal and application programs and a data memory for storing install data and application data generated in using the application programs. According to an exemplary embodiment of the present invention, the memory 210 may include a region for processing cloud service data (hereinafter, referred to as cloud region). In the case of the meta only on mode, the cloud region is not used.

The input unit 240 is capable of receiving a command input for controlling the operation of the terminal and data. The display unit 250 is capable of displaying visual data under the control of the control unit 200. As an example, the input unit 240 and the display unit 250 may be integrated into a touchscreen panel. The camera 260 is capable of taking a picture and, if necessary, uploading the picture to a server under the control of the control unit 200.

Each of the first and second communication units 220 and 230 is capable of connecting to a base station through a radio link for voice and data communication and/or connecting to an Internet Protocol (IP) network for data communication. The communication unit connected to a base station is capable of including a modulator/demodulator for processing 3rd Generation (3G) or 4th Generation (4G) communication system signal for providing voice and data communication services, and the communication unit connected to an IP network is capable of accessing an Internet server for data communication service. In the following description, it is assumed that the first communication unit 220 is the communication unit for establishing a connection to the IP network 110 with a modem supporting at least one of WiFi, WiBro, and WiMax technologies. In addition, it is assumed that the second communication unit 230 is the communication unit for establishing a connection to a base station with a modem supporting at least one of GSM, CDMA, WCDMA, LTE technologies, and the like for voice and data communication. As an example, the second communication unit 230 is capable of connecting to the IP network via a base station. Although FIG. 2 is directed to the case in which the terminal is equipped with two communication units, it is also possible the terminal is equipped with additional communication units for connecting to other communication systems (e.g., GSM, WCDMA, LTE, and the like base stations). For example, although the first and second communication units are depicted in FIG. 2, the terminal may be equipped with three or more communication units.

The above structured terminal operates as a client of the server 120, and the server 120 and the client (i.e., the terminal) has the same menu structure of the cloud data as synchronized. The server 120 stores the meta information synchronized with the copies stored in the terminal and the real data represented by the meta information, while the terminal stores only the meta information or both the meta information and the real data.

According to an exemplary embodiment of the present invention, the above structured terminal processes the real data based on the meta information in cloud data synch procedure to provide differentiated user scenarios of the meta data only on/off mode and switches between the meta data only on mode and meta data off mode depending on the residual device memory space.

In order to accomplish this, the above structured terminal displays and processes the real data stored in the server using the meta information representing the real data and synchronized with the copies stored in the terminal. The terminal is operating in one of the meta only on mode and meta only off mode that can be configured in the settings menu and, especially when it is operating in the meta only on mode, the cloud data synchronization is performed at the meta information level. This is advantageous in application to the low end terminal or low memory capacity terminal and also applicable to the high end terminal for avoiding memory shortage. If a specific piece of meta information is selected in the meta only on mode, the terminal downloads the real data corresponding to the meta information from the server and processes the downloaded data in the cache region.

If the meta only on mode is terminated, the terminal formats the cache region to secure the space processing another file. In the case of the device having no memory space for use as the device cache region, it is possible to use the space of an external memory card.

In the case that the terminal is operating in the meta only off mode, the cloud data synchronization is performed at both the meta information level and the real data level. In this case, the terminal performs synchronization of all data saved in the cloud server 120 based on the initial meta information and then downloads the real data corresponding to the meta information in sequence provided the memory 210 (e.g., it can be the cloud region) has space (e.g., the meta data is replaced by the real data). At this time, the tolerable range for replacement by the real data can be a predetermined threshold value of n% (e.g., 85%) and, if it exceeds n%, the meta information are no longer replaced. In the case that the user deletes the cloud data (e.g., the data stored in the cloud region) such that the used memory space of the terminal become equal to or less than m% (e.g., 70%), the terminal is capable of replacing the meta information with the corresponding real data. In the case that a certain piece of meta information is selected before the replacement with the real data, the corresponding meta information is replaced with the corresponding real data first.

Figure 3A:
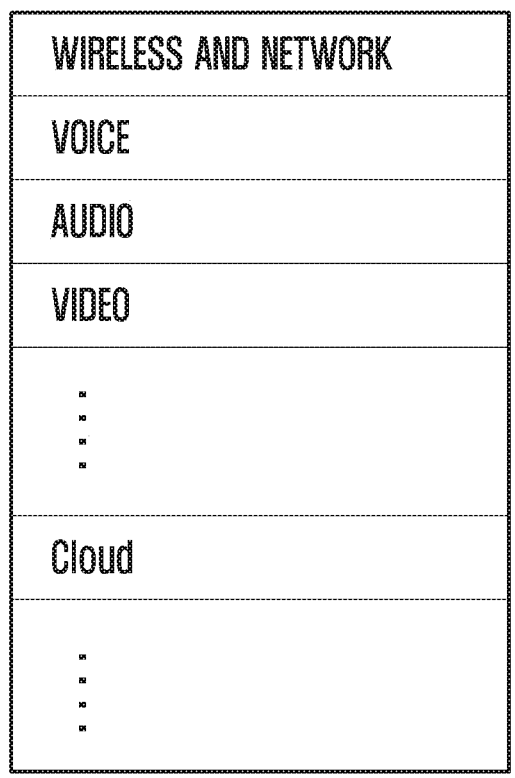

FIGS. 3A and 3B are diagrams illustrating screens for configuring data synchronization for use in data synchronization between a terminal and a server according to an exemplary embodiment of the present invention.

Referring to FIGS. 3A and 3B, if a setting menu is selected by the user, the control unit 200 controls the display unit 250 to display a setting menu list as shown in FIG. 3A and, if a cloud synchronization menu item is selected from the setting menu list, controls the display unit 250 to display a sync setting menu screen as shown in FIG. 3B. The sync setting menu screen is provided with a list of the content items with respective on/off options. The list includes the contents items of music, video, picture, document, etc. that can be synchronized between the terminal and the server. If the option of a content item is set to on, the meta information belonging to the content item is synchronized between the terminal and the server 120 in the meta only on mode and both the meta information belonging to the content item and the real data corresponding to the meta information are synchronized between the terminal and the server 120 in the meta only off mode.

A description is made of the terminal operation in the meta only off mode hereinafter in detail.

Figure 4A:
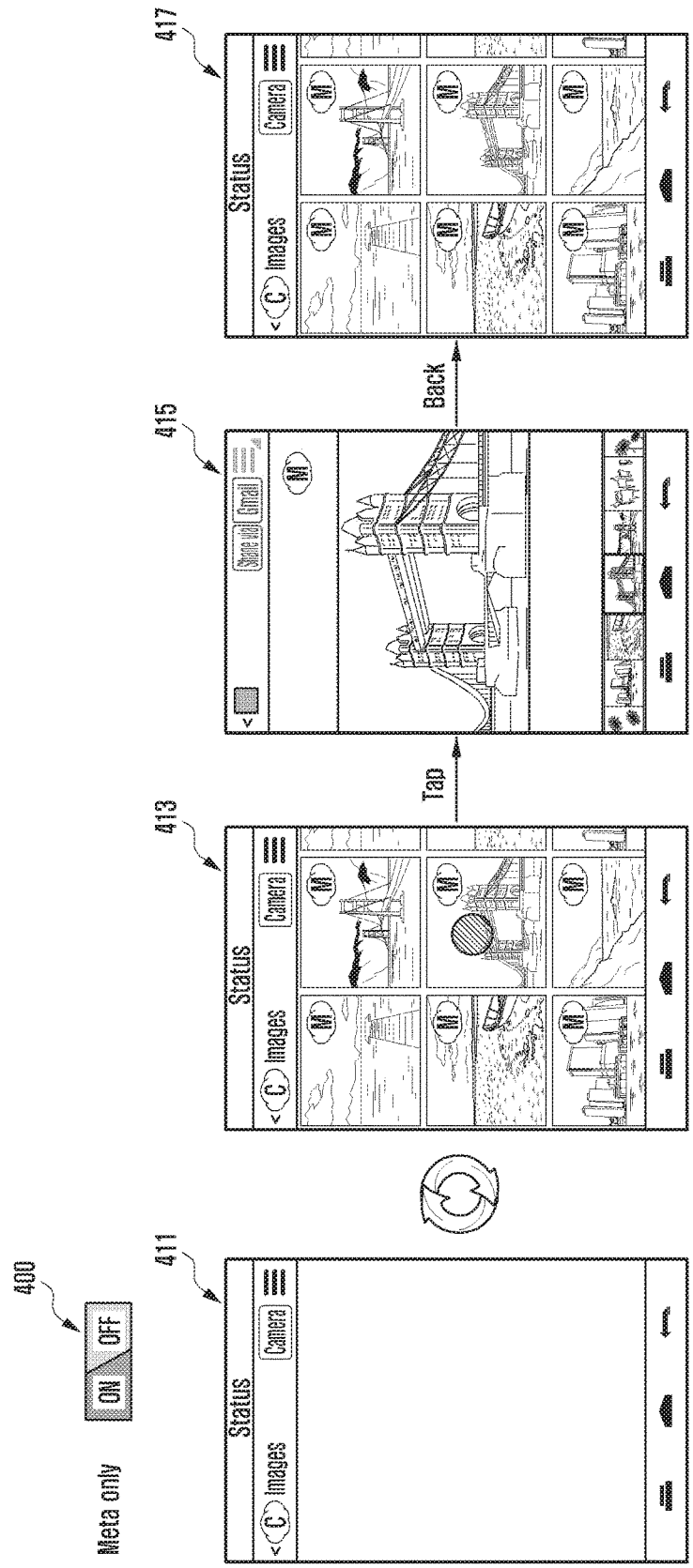
FIGS. 4A and 4B are diagrams illustrating exemplary screens displayed in a meta only on mode of a terminal according to an exemplary embodiment of the present invention.
Figure 4B:
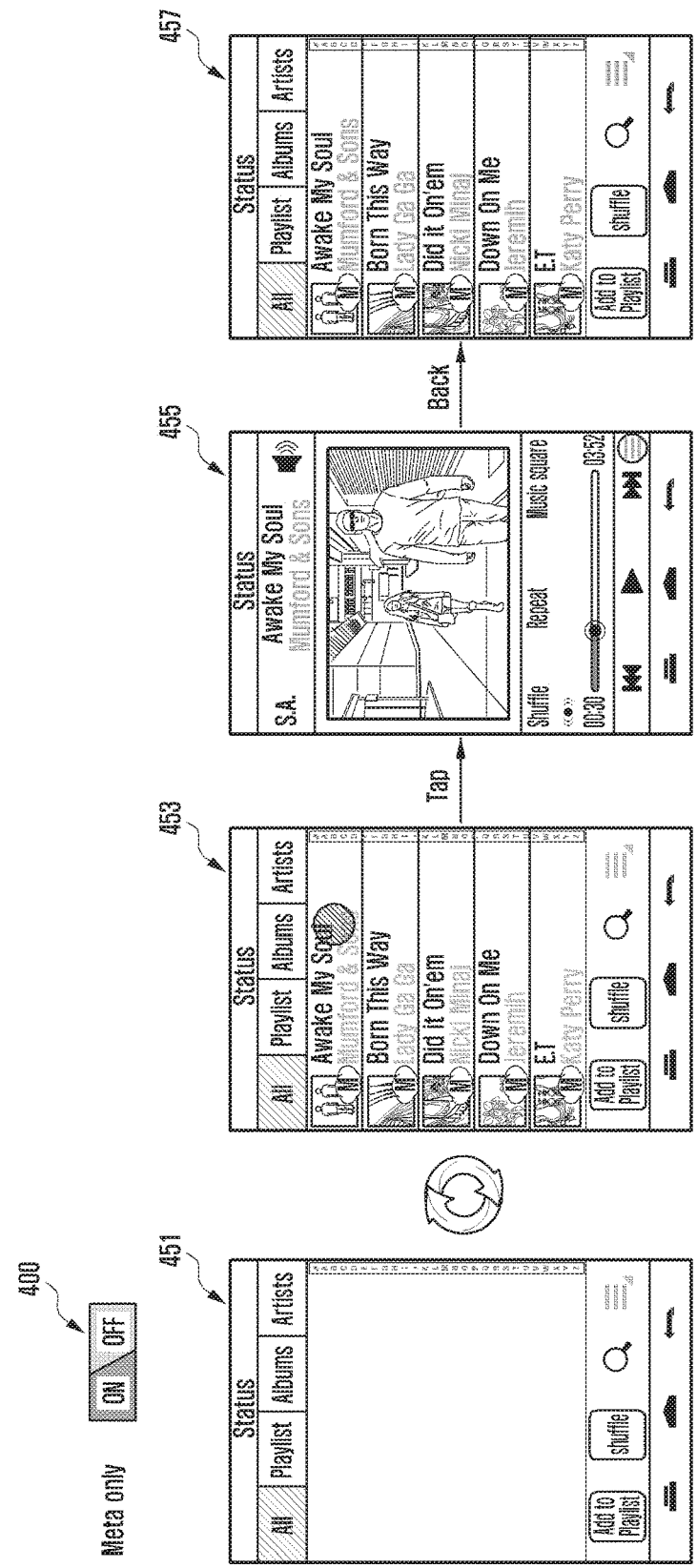

FIGS. 4A and 4B are diagrams illustrating exemplary screens displayed in a meta only on mode of a terminal according to an exemplary embodiment of the present invention. In particular, FIG. 4A is directed to the meta only on mode for picture items, and FIG. 4B is directed to the meta only on mode for music items.

Referring to FIG. 4A, if the picture option is set to On in the meta only on mode, all pictures are synchronized by corresponding meta information between the terminal and the server. In this state, if a picture menu item (e.g., gallery menu item) is selected, the control unit 200 controls the display unit 250 to display a picture menu screen as denoted by reference number 411 with the indication of the meta only on mode as denoted by reference number 400. Afterward, the control unit 200 controls to display the meta information of the pictures as denoted by reference number 413 with the indication icon indicating the meta only on mode (e.g., in FIG. 4A, indication of "M"). Here, the meta information of each picture may include a thumbnail image and exchangeable image file format (e.g., exif) information and can be presented as the thumbnail image as denoted by reference number 413. In this state, if a specific thumbnail image is selected (e.g., the meta information of specific picture), the control unit 200 detects the selection and requests the server 120 for the real data represented by the meta information and controls the display unit 250 to display the downloaded image to be fit to the screen horizontally as denoted by reference number 415. At this time, the downloaded picture is executed in the cache region of the memory 210 to be displayed on the screen along with the meta only on icon "M" as shown in the screen 415. If it is requested to terminate displaying the picture corresponding to the selected meta information, the thumbnail view screen reappears as denoted by reference number 417. At this time, the real data executed in the cache region of the memory 210 is deleted for next data processing.

Referring to FIG. 4B, if the picture option is set to On in the meta only on mode, all music are synchronized by corresponding meta information between the terminal and the server. In this state, if a music menu item (e.g., music collection menu item) is selected, the control unit 200 controls the display unit 250 to display a music menu screen as denoted by reference number 451 with the indication of the meta only on mode as denoted by reference number 400. Afterward, the control unit 200 controls to display the meta information of the music as denoted by reference number 453 with the indication icon indicating the meta only on mode (e.g., in FIG. 4B, indication of "M"). Here, the meta information of each music item may include a thumbnail image and exchangeable image file format (e.g., exif) information and can be presented as the thumbnail image as denoted by reference number 453. In this state, if a specific thumbnail image is selected (e.g., the meta information of specific music item), the control unit 200 detects the selection and requests the server 120 for the real data represented by the meta information and controls to play the corresponding music item and controls the display unit 250 to display the downloaded image to be fit to the screen horizontally as denoted by reference number 455. At this time, the downloaded music item and/or corresponding image is executed in the cache region of the memory 210 to be played and/or displayed on the screen along with the meta only on icon "M" as shown in the screen 455. If it is requested to terminate playing the music item and/or displaying the image corresponding to the selected meta information, the thumbnail view screen reappears as denoted by reference number 457. At this time, the real data executed in the cache region of the memory 210 is deleted for next data processing.

In the case that a music menu item is selected, the selected music item is processed in the meta only on mode. As described above, if cloud service items (e.g., Photo, Music, Video, Document, and the like) are selected, the meta only on mode operations are applied to all contents in the same manner such that, although the file corresponding to the selected meta information is executed, the terminal does not replace the meta information with the real data (e.g., does not store the real data in the memory 120) but maintains only the meta information. This technique is advantageous to the low end and low capacity terminals and also can be applied to the higher end terminals to avoid memory shortage problem.

A description is made of the terminal operation in the meta only off mode hereinafter in detail.

Figure 5A:
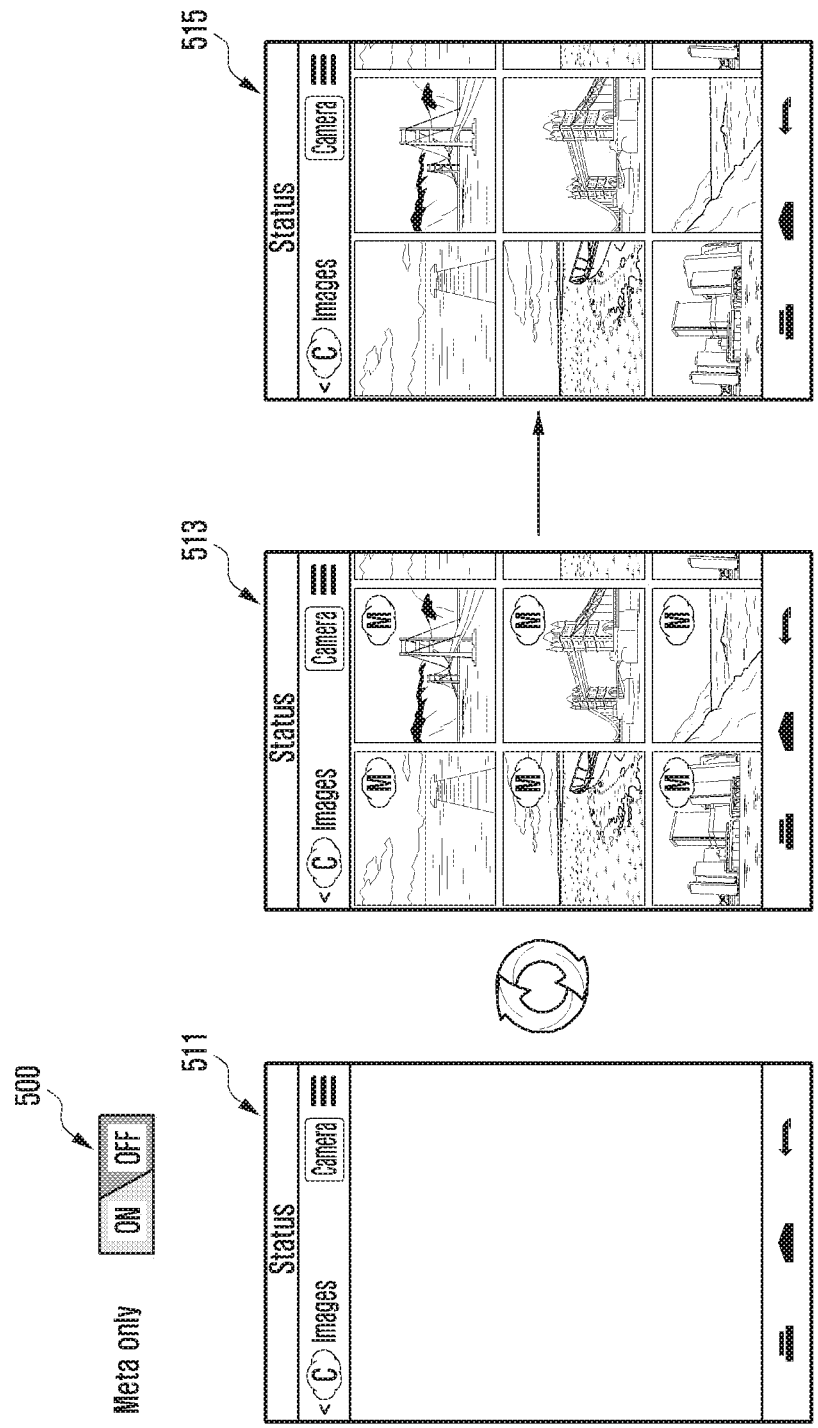
Figure 6:
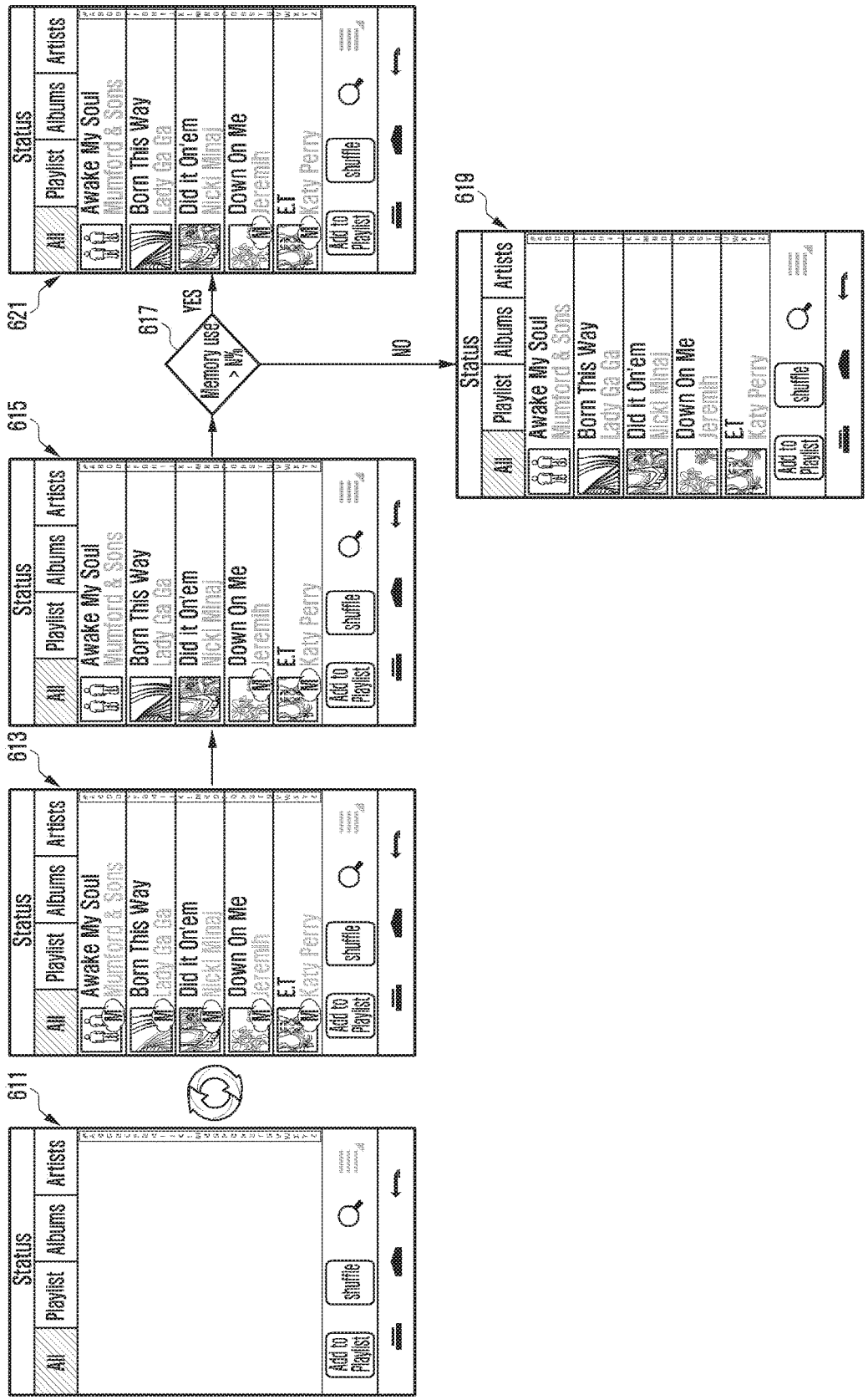
FIG. 6 is a diagram illustrating exemplary screens displayed when a terminal switches from a meta only off mode to a meta only on mode according to an exemplary embodiment of the present invention.

FIGS. 5A and 5B are diagrams illustrating exemplary screens displayed in the meta only off mode of the terminal according to an exemplary embodiment of the present invention. In particular, FIG. 5A is directed to the initial synchronization procedure for synchronizing pictures between the terminal and the server, and FIG. 5B is directed to the initial synchronization procedure for synchronizing music files between the terminal and the server. FIG. 6 is a diagram illustrating exemplary screens displayed when a terminal switches from a meta only off mode to a meta only on mode according to an exemplary embodiment of the present invention, and FIG. 7 is a diagram illustrating exemplary screens displayed when a terminal switches from a meta only on mode to a meta only off mode according to an exemplary embodiment of the present invention.

Referring to FIGS. 5A and 5B, the data synchronization, in the meta only off mode, is performed in such a way that both the meta information and the real data stored in the terminal are synchronized with the copies stored in the server. If the meta only off mode is selected as denoted by reference number 500, the control unit 200 displays an indicator indicating that the terminal operates in the meta only off mode as denoted by reference number 511 and 551. Afterward, the control unit 200 displays the meta information of the items belonging to the selected data type on the screen as denoted by reference number 513 and 553 along with the meta information indication icons. After displaying the meta information, the control unit 200 controls the first communication unit 220 or the second communication unit 230 to request the server 120 to transmit the real data corresponding to the respective meta information and stores the real data downloaded from the server 120 in the memory 120. Once the real data has been stored, the control unit 200 controls such that the meta information indication icons disappear on the display unit 250 as denoted by reference number 515 and 555. If the meta only off mode is selected as described above, the control unit 200 downloads the real data corresponding to the meta information displayed on the screen to replace the meta information with the downloaded real data in sequence.

Referring to FIG. 6, the control unit 200 displays an indicator indicating that the terminal operates in the meta only off mode as denoted by reference number 611. Afterward, the control unit 200 displays the meta information of the items belonging to the selected data type on the screen as denoted by reference number 613 along with the meta information indication icons. After displaying the meta information, the control unit 200 controls the first communication unit 220 or the second communication unit 230 to request the server 120 to transmit the real data corresponding to the respective meta information and stores the real data downloaded from the server 120 in the memory 120. Once the real data has been stored, the control unit 200 controls such that the meta information indication icons disappear on the display unit 250 as denoted by reference number 615. According to exemplary embodiments of the present invention, in the state in which the real data corresponding to the meta information have been downloaded, if a piece of meta information is selected on the screen as denoted by reference number 615, the selected meta information is replaced by the corresponding real data which is stored in the memory 120. In this case, the memory 210 of the terminal stores the real data and this may cause residual memory shortage (meta only (off)—memory full (memory >N%). In order to solve this problem, the control unit 110 analyzes, when a piece of meta information is selected, the residual memory space of the memory 210 as denoted by reference number 617 to maintain, when there is sufficient residual memory space, the meta only off mode to download the real data corresponding to the meta information as denoted by reference number 619 and, otherwise, switches to the meta only on mode as denoted by reference number 621. For example, the terminal operating in the meta only off mode replaces the meta information with the real data and, if the real data stored in the memory 210 is greater than a predetermined size (N%), stops downloading the real data and switches the operation mode from the meta only off mode to the meta only on mode.

Figure 7:
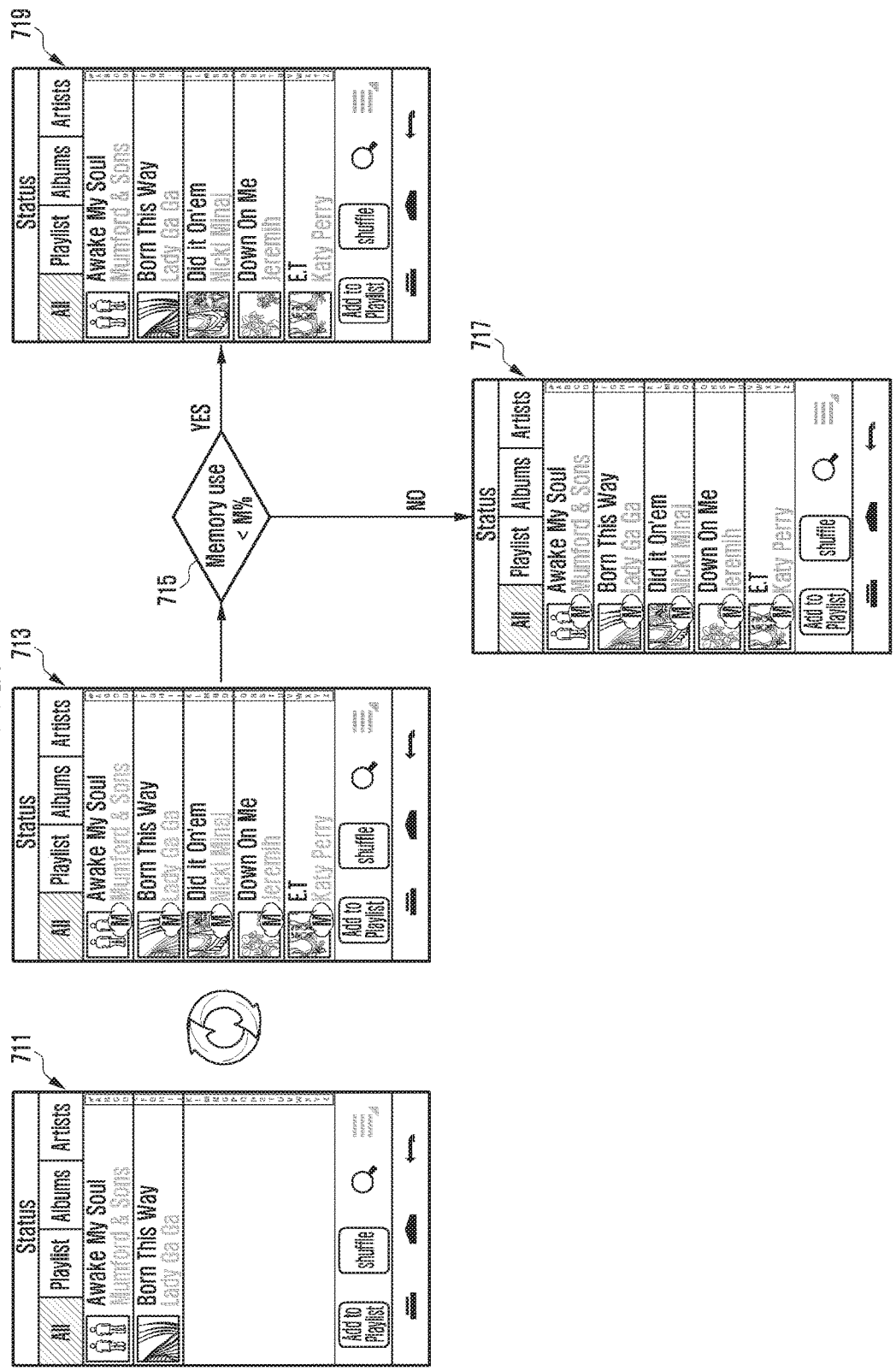
FIG. 7 is a diagram illustrating exemplary screens displayed when a terminal switches from a meta only on mode to a meta only off mode according to an exemplary embodiment of the present invention.

Referring to FIG. 7, after switching from the meta only off mode to the meta only on mode, the operation mode may be switched again from the meta only on mode to the meta only off mode. Reference number 711 denotes that the control unit 200 executes the meta only off mode. As an example, when the used storage space of the memory 210 is over N%, the control unit 200 executes the meta only on mode, and the meta information is displayed on the display unit 250 along with the meta only on mode indication icon as denoted by reference number 713. At this time, the user is capable of deleting specific files to maintain the used storage space of the memory below N%. However, it is not mandatory to replace the meta information to the real data when the used storage space is equal to or less than N%. This is because the memory full situation may occur so frequently around the N%. In order to overcome this problem, the control unit 200 controls such that when the used storage space become less than the N% in the meta only on mode, the meta only on mode is maintained as denoted by reference number 717. In the case that the used storage space of the memory 210 is less than M%, the control unit 200 detects this as denoted by reference number 715 and executes the meta only off mode as denoted by reference number 719 such that it becomes possible to download the real data corresponding to the meta information. As an example, M% may be set to a value less than N%, and it is assumed that N is 85 and M is 70.

Figure 8:
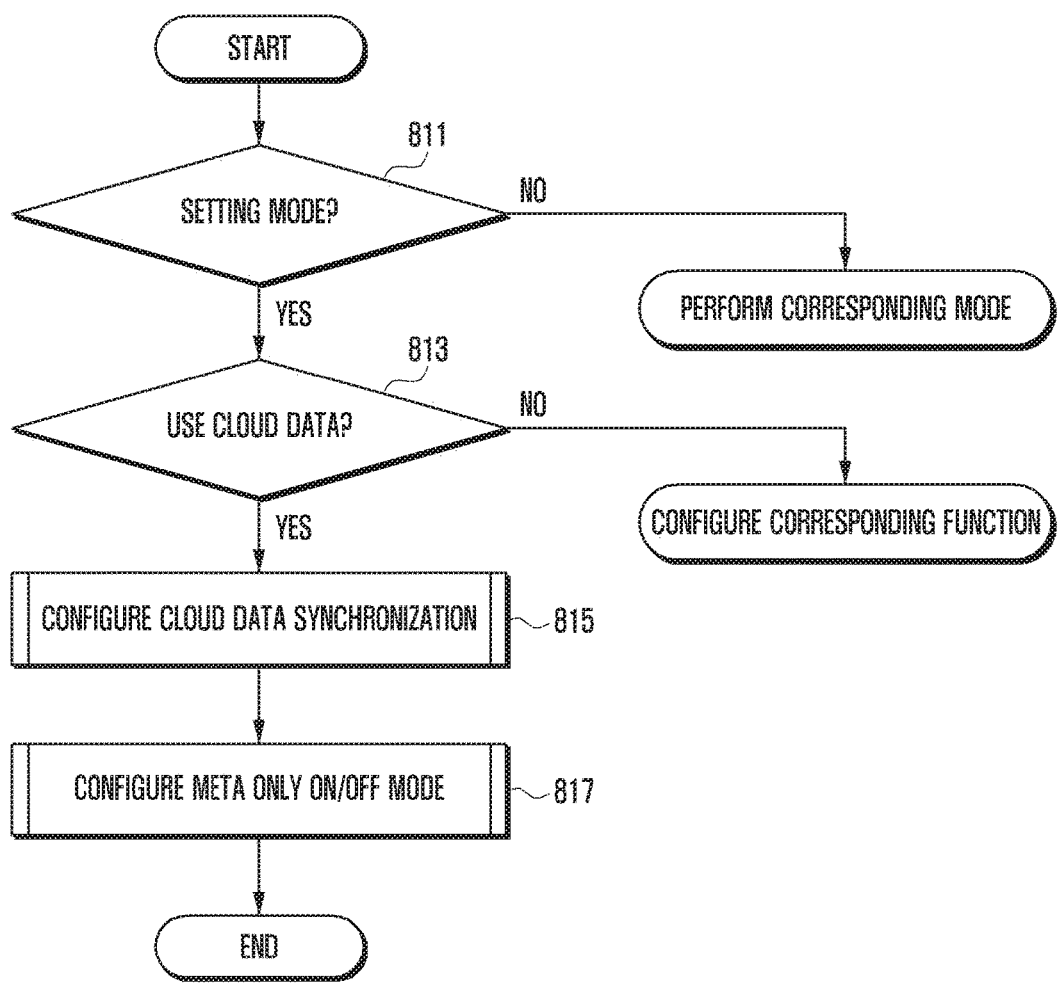
FIG. 8 is a flowchart illustrating a procedure for synchronizing meta information and data types for cloud service between a terminal and a server according to an exemplary embodiment of the present invention.

FIG. 8 is a flowchart illustrating a procedure for synchronizing meta information and data types for cloud service between a terminal and a server according to an exemplary embodiment of the present invention.

Referring to FIG. 8, if the user selects a setting menu using the input unit 240, the control unit 200 detects user input at step 811 and displays the setting menu screen on the display unit 250 as shown in FIG. 3A. If a cloud service item is selected on the setting menu screen, the control unit 200 detects this selection at step 813 and displays a cloud service setting menu screen as shown in FIG. 3B. The cloud service setting menu screen can be provided per data type or integrally to list all of the data types on a single page as shown in FIG. 3B. According to the user input, the control unit 200 sets the data type to be synchronized through the cloud service and the meta only on mode at steps 815 and 817. As an example, the data types may include music, video, picture, document, and the like that can be turned on individually for synchronizing the data belonging to the selected data type between the terminal and the cloud server. As described above, the terminal can be configured to operate in one of the meta only on mode and the meta only off mode.

Figure 9:
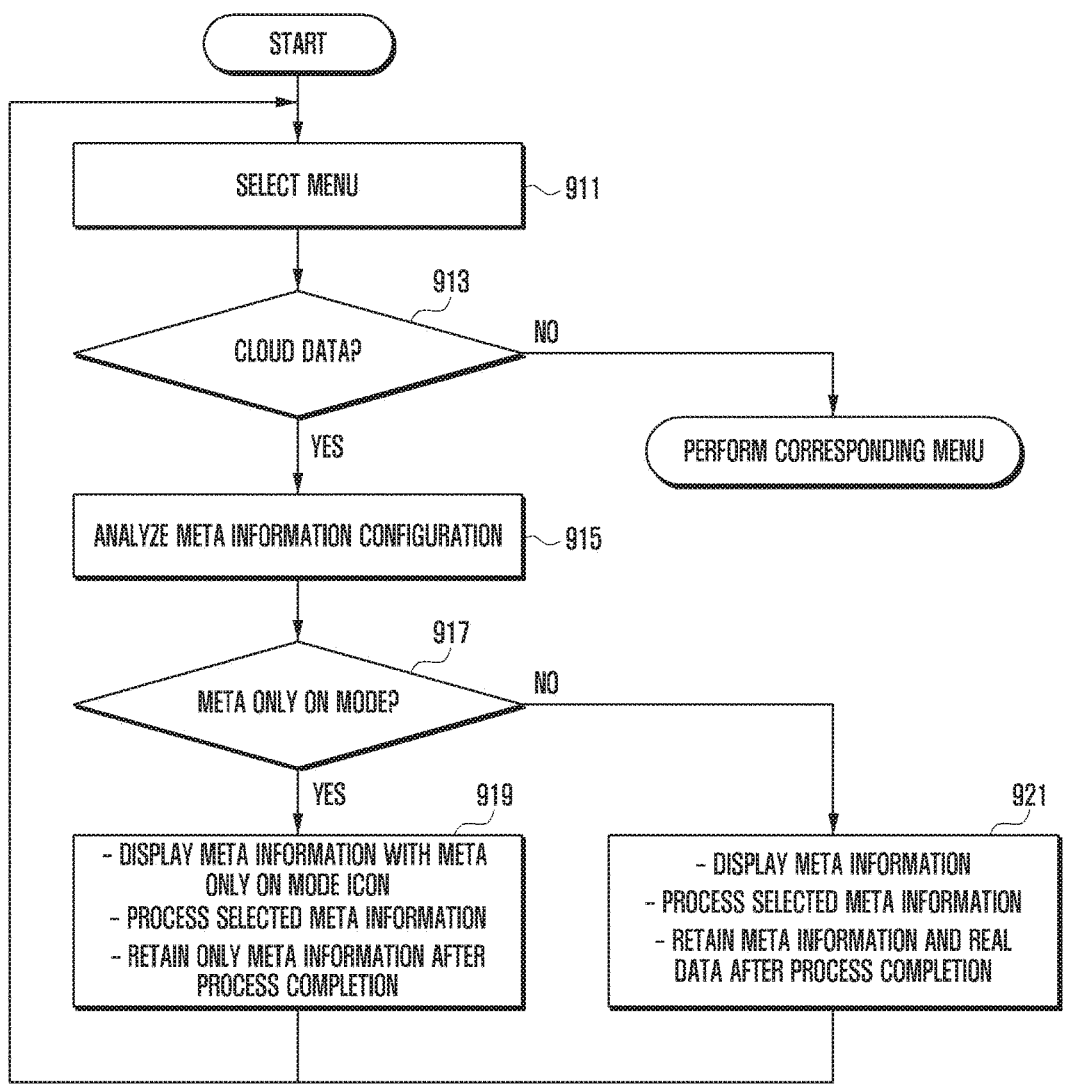
FIG. 9 is a flowchart illustrating a terminal procedure for executing a cloud service between a terminal and a server according to an exemplary embodiment of the present invention.

FIG. 9 is a flowchart illustrating a terminal procedure for executing a cloud service between a terminal and a server according to an exemplary embodiment of the present invention.

Referring to FIG. 9, if the user selects a menu item, the control unit 200 detects the menu selection and determines whether the selected menu is the cloud service setting menu at step 911. As an example, the cloud service setting menu is displayed in the form of a cloud service setting menu screen as shown in FIG. 3B. If a data type (e.g., picture, video, music, document, or the like) is selected on the cloud service setting menu screen, the control unit 200 detects this selection at step 913 and analyzes the meta information utilization mode at step 915 and determines whether the meta information utilization mode is the meta only on mode or the meta only off mode at step 917.

If it is determined that the current meta information utilization mode is the meta only on mode at step 917, the controls unit 200 downloads the meta information of the enabled data types, displays the corresponding meta information with the meta only on mode indicator icon, and deletes the downloaded real data after consumption to maintain only the corresponding meta information at step 919. Otherwise, if it is determined that the current meta information utilization mode is the meta only off mode at step 917, the control unit 200 downloads the meta information of the data belonging to the selected data type, displays the downloaded meta information, downloads, if a specific piece of meta information is selected, the real data corresponding to the selected meta information, and stores the downloaded real data in the memory 120.

Figure 10:
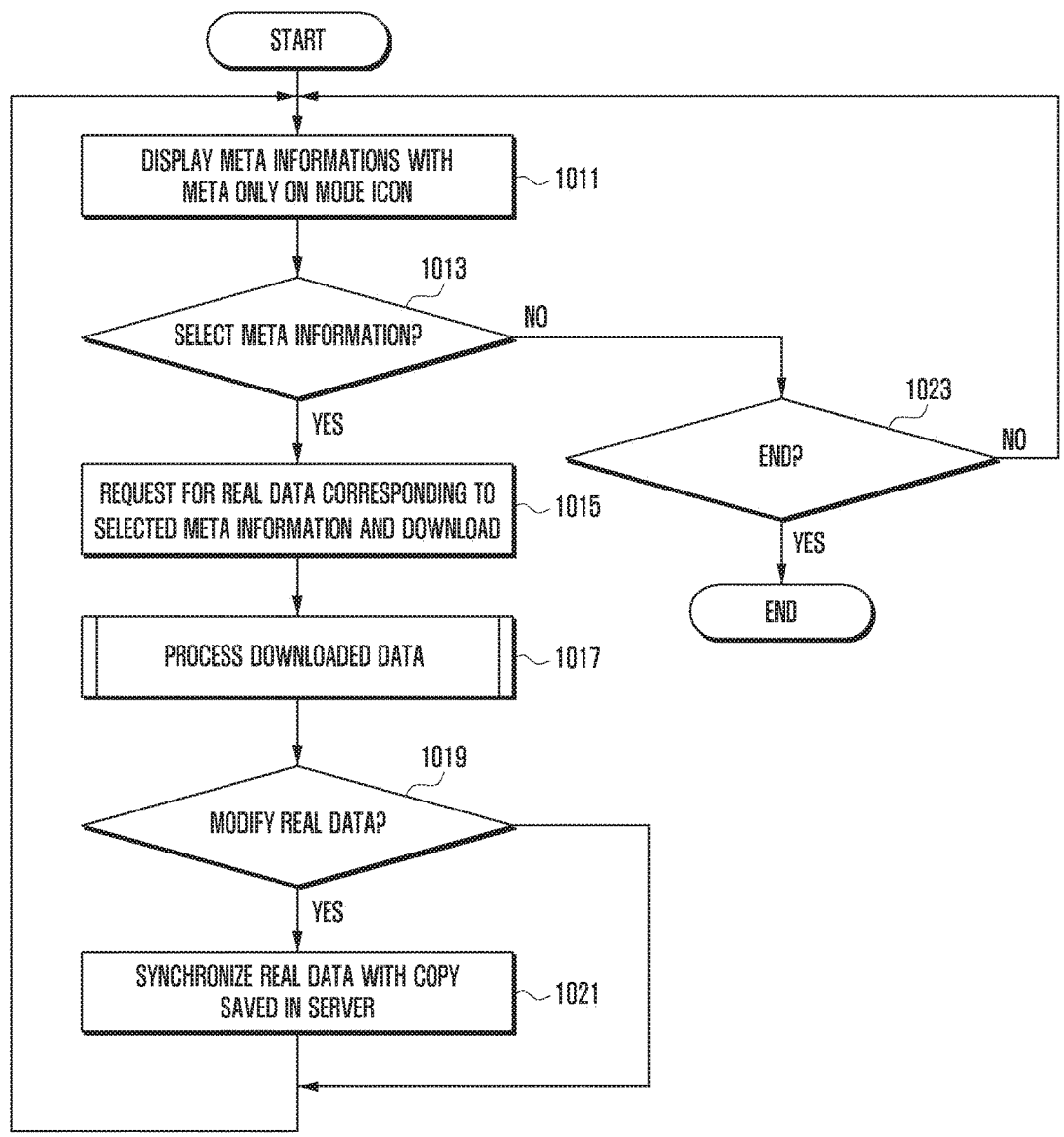
FIG. 10 is a flowchart illustrating a terminal procedure for processing a meta only on mode cloud service according to an exemplary embodiment of the present invention.

FIG. 10 is a flowchart illustrating a terminal procedure for processing a meta only on mode cloud service according to an exemplary embodiment of the present invention.

Referring to FIG. 10, when the meta only on mode is activated, the control unit 100 displays a list of the data items (i.e., the meta information corresponding to the data belonging to the selected data type) on the display unit 250 at step 1011. The meta information are displayed along with the meta only on indication icon as shown in FIGS. 4A and 4B. In the state in which the meta information is displayed on the screen as denoted by reference numbers 413 of FIG. 4A and 453 of FIG. 4B, if a specific piece of meta information is selected by means of the input unit 250, the control unit 200 detects this selection at step 1013 and requests the server 120 to transmit the real data corresponding to the selected meta information and downloads the real data, the downloaded real data being buffered in the cache region of the memory 120, at step 1015. Next, the control unit 200 processes the downloaded real data at step 1017. At this time, if the downloaded real data is a picture, the control unit 200 controls to display the picture on the display unit 205 in a full screen view as denoted by reference number 415 and, otherwise if the downloaded real data is a music file, play the music file with the presentation of the meta information of the music file (e.g., text information, thumbnail image, song title, singer, and the like) on the display unit 250 at step 1017. At this time, the real data may be changed in processing. For example, the user may delete the real data or add new information to the real data.

If a certain change occurs in the real data, the control unit 200 detects the change at step 1019 and uploads the changed real data to the server 120 to synchronizes the meta information and real data with the copies saved in the server 120 at step 1021. After processing the real data (it can be the tapping action in FIGS. 4A and 4B), the control unit 200 deletes the real data buffered in the cache region for next process and returns the procedure to step 1011 to displays the meta information in the meta only on mode (see step 417 of FIG. 4A and 457 of FIG. 4B. At this time, if a termination request is input by means of the input unit 240, the control unit 200 detects at step 1023 and ends the meta only on mode operation.

As described above, the terminal operating in the meta only on mode displays the meta information of the data belonging to the selected data type along with the meta only on mode indicator icon. If a specific piece of meta information is selected, the terminal requests the server 120 for the real data corresponding to the meta information, downloads the real data, displays the downloaded real data, and processes the real data according to the user's intention.

Afterward, if the real data is processed completely with a certain change, the terminal uploads the changed real data to the server 110.

Figure 11:
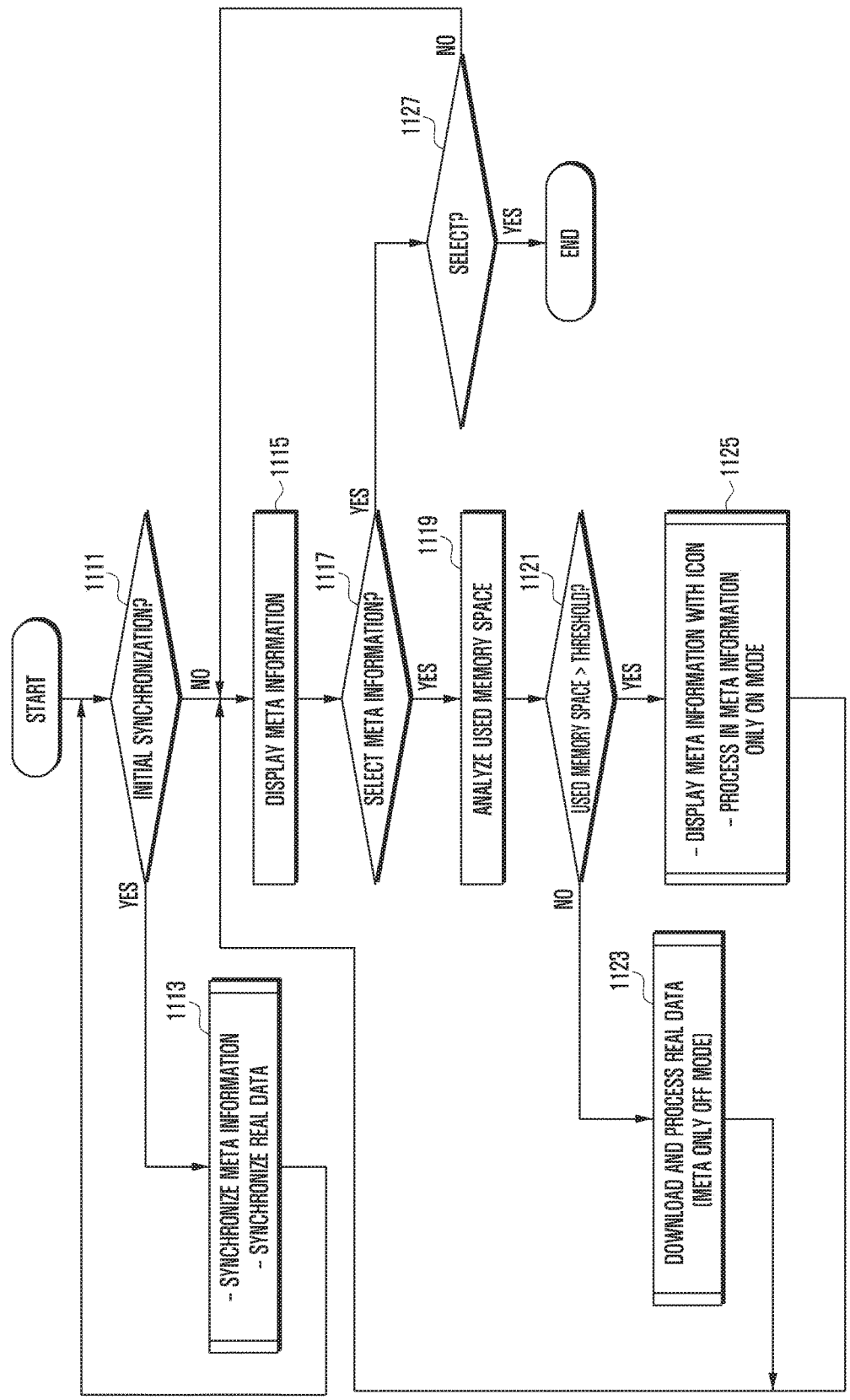
FIG. 11 is a flowchart illustrating a terminal procedure for processing a meta only off mode cloud service according to an exemplary embodiment of the present invention.

FIG. 11 is a flowchart illustrating a terminal procedure for processing a meta only off mode cloud service according to an exemplary embodiment of the present invention.

Referring to FIG. 11, the control unit 200 monitors to detect a synchronization request in the meta only off mode and, if the synchronization request is detected, determines whether the synchronization is an initial synchronization at step 1111. If it is the initial synchronization, the control unit 200 downloads the meta information of the data belonging to the selected data type and then the real data corresponding to the meta information at step 1113. Once the initial synchronization has completed, the terminal and the server 120 are in the state in which the meta information and the real data belonging to the selected data type are synchronized.

If a data item is selected in this state, the control unit 200 controls to display the meta information of the selected data item at step 1115. If the meta information is not selected, the control unit 200 controls to determine whether to terminate the process or to return to step 1115 at which the meta information is displayed. If the meta information is selected, the control unit 200 detects this at step 1117 and analyzes the meta data amount stored in the cloud region of the memory 120 (used memory space) at step 1119. At this time, if the used memory space is not greater than a predetermined threshold, the control unit 200 detects this at step 1121 and maintains the meta only off mode at step 1123. In the meta only off mode, the terminal downloads the real data corresponding to the selected meta information as denoted by reference number 619 of FIG. 6, displays and processes the downloaded real data, stores the processed result in the memory 220, and uploads the processed data to the server 120. If the used storage space is greater than the threshold value, the control unit 200 detects this at step 1121 and proceeds to step 1125 at which the control unit 200 switches to the meta only on mode as denoted by reference number 621 of FIG. 6.

Figure 12:
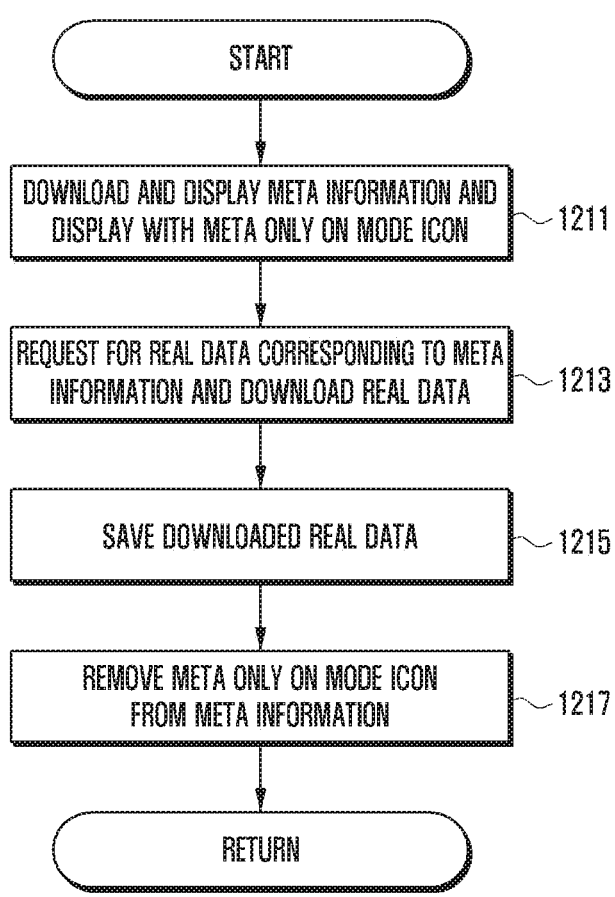
FIG. 12 is a flowchart illustrating a detail of an initial synchronization process in a meta only off mode such as, for example, the initial synchronization process of step 1113 of FIG. 11, according to an exemplary embodiment of the present invention.

FIG. 12 is a flowchart illustrating a detail of an initial synchronization process in a meta only off mode such as, for example, the initial synchronization process of step 1113 of FIG. 11, according to an exemplary embodiment of the present invention.

Referring to FIG. 12, the control units requests the server 120 for the meta information representing the data belonging to the selected data type and displays the downloaded meta information along with the meta only on mode indicator icon on the screen as denoted by reference numbers 513 of FIG. 5A and 553 of FIG. 5B at step 1211. Afterward, the control unit 200 requests the server 120 for the real data corresponding to the displayed meta information at step 1213 and stores the downloaded real data in the memory 210 at step 1215. Next, at step 1217, the control unit 200 controls such that the meta only on mode indicator icon disappears from the meta information of which real data have been downloaded and stored in the memory 210 as shown on the screen denoted by reference numbers 515 of FIG. 5A and 555 of FIG. 5B. Once the initial synchronization has been completed, the terminal and the server 120 acquire synchronization of both the meta information and the real data. Afterward, if a piece of meta information is selected, the terminal analyzes the used memory space and processes the real data according to the analysis result.

Figure 13:
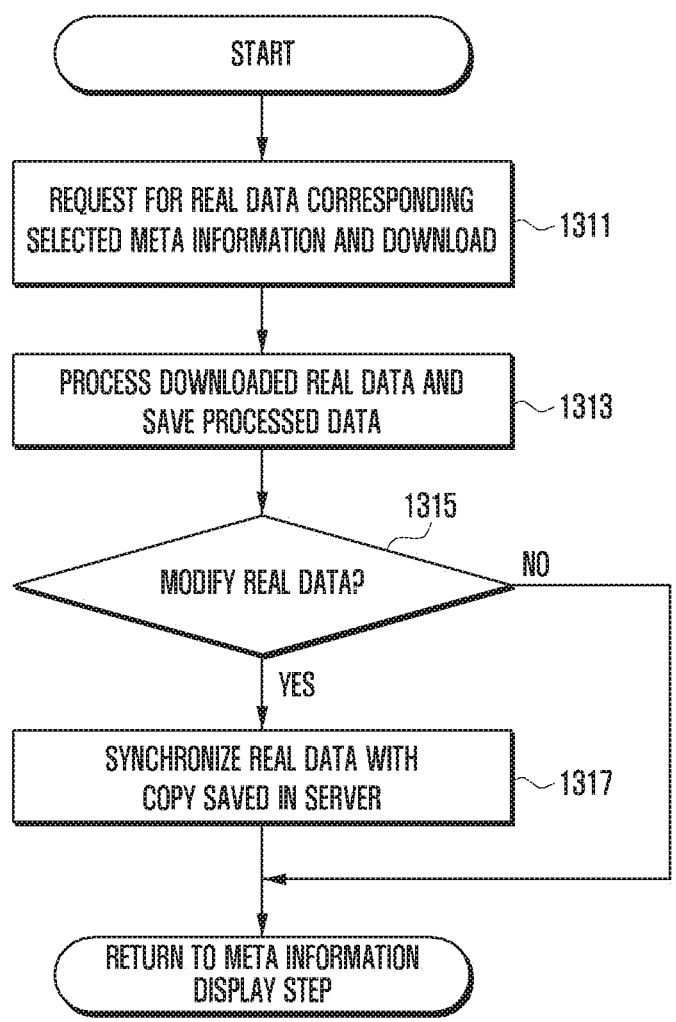
FIG. 13 is a flowchart illustrating a detail of a real data download process when a used memory space is less than a threshold value in a meta only off mode such as, for example, the real data download process of step 1123 of FIG. 11, according to an exemplary embodiment of the present invention.

FIG. 13 is a flowchart illustrating a detail of a real data download process when a used memory space is less than a threshold value in a meta only off mode such as, for example, the real data download process of step 1123 of FIG. 11, according to an exemplary embodiment of the present invention.

Referring to FIG. 13, the control unit 200 requests the server 120 to transmit the real data corresponding to the selected meta information at step 1311 and displays and processes the downloaded real data and then stores the processed real data in the memory 210 at step 1313. Afterward, if a change occurs in the real data, the control unit 200 detects the change at step 1315 and uploads the changed real data to the server 120 to acquire synchronization of the meta information and the corresponding real data between the terminal and the server 120 at step 1317 if there is a detected change in the real data. Otherwise, if no change is detected at step 1315, the process returns to displaying meta information.

Figure 14:
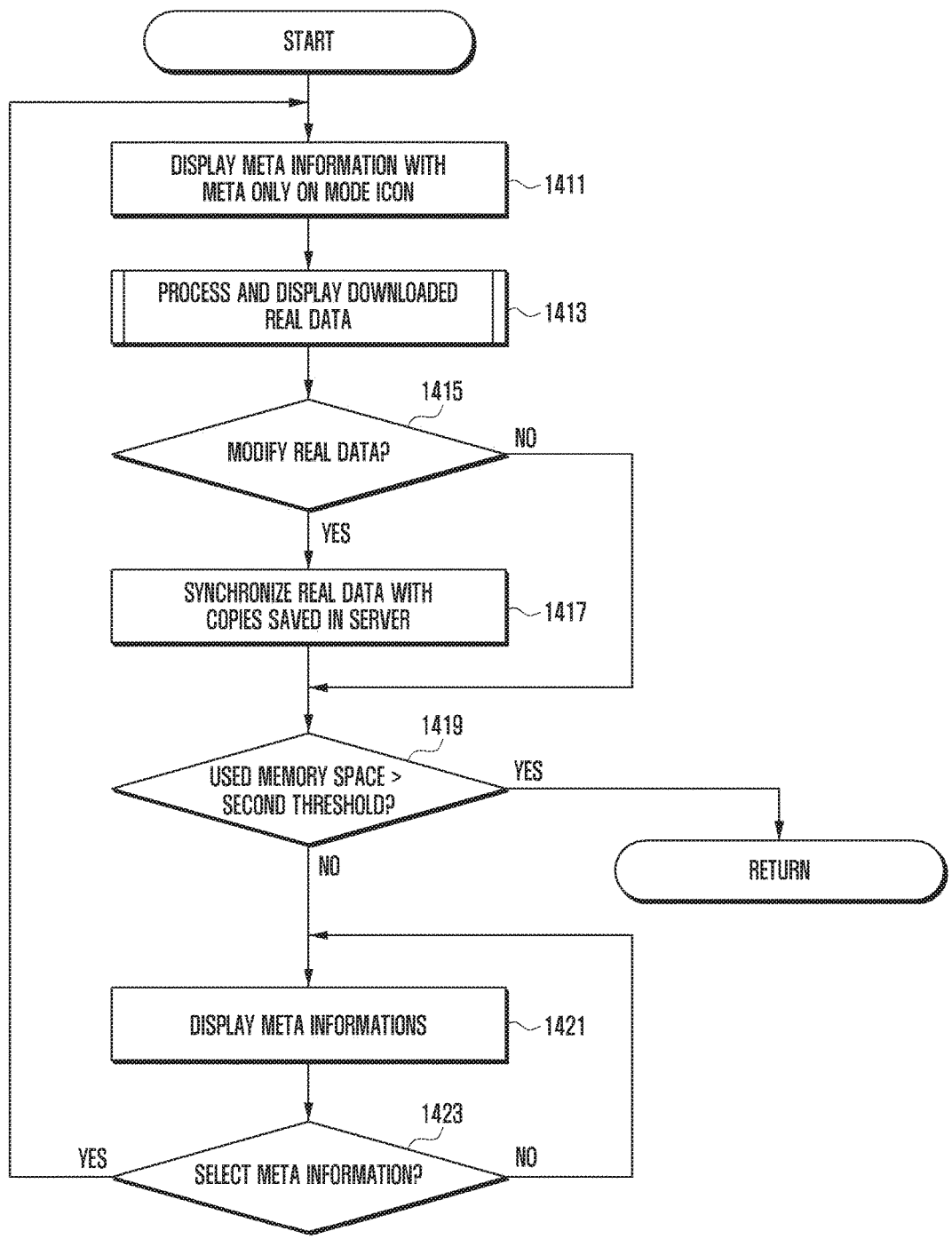
FIG. 14 is a flowchart illustrating a detail of switching from a meta only off mode to a meta only on mode when a used memory space is greater than a threshold value such as, for example, the switching from the meta only off mode to the meta only on mode of step 1125 of FIG. 11, according to an exemplary embodiment of the present invention.

FIG. 14 is a flowchart illustrating a detail of switching from a meta only off mode to a meta only on mode when a used memory space is greater than a threshold value such as, for example, the switching from the meta only off mode to the meta only on mode of step 1125 of FIG. 11 according to an exemplary embodiment of the present invention.

FIG. 14 is directed to the case in which the used memory space is greater than the first threshold (N%). In this case, the control unit 200 controls to display the selected meta information with the meta only on mode indicator icons as shown in the screen denoted by reference number 621 of FIG. 6 at step 1411. This means that the terminal has switched from the meta only off mode to the meta only on mode and thus some meta information displayed on the display unit 240 may have and the other may not have the corresponding real data stored in the terminal. In this case, the control unit 200 controls such that the meta information having no real data are displayed with the meta only on mode indication icon as shown on the screen denoted by reference number 621 of FIG. 6. The control unit 200 displays and processes the downloaded real data without storing the processed data at step 1413. If a certain change occurs in the processed real data, the control unit 200 detects the change and uploads the changed real data to the server 120 at step 1415. In the meta only on mode, the control unit 200 displays the meta information at step 1421 and downloads and processes the real data corresponding to the meta information. At this time, the meta information displayed at step 1421 have the meta only on mode indicator icon (indicating that the terminal has no real data corresponding to the meta information) as shown on the screen denoted by reference number 717 of FIG. 7. Thereafter, the control unit 200 detects (e.g., polls for input) whether meta information is selected at step 1423. If meta information is determined to be selected, the process proceeds to step 1421. Otherwise, if meta information is determined to have not been selected, the process returns to step 1421.

In the meta only on mode, the user is capable of changing the real data stored in the cloud region of the memory 210. The change may include deleting the save data or adding new data and, if a certain change occurs, the control unit 200 detects this at step 1415 and uploads the changed real data to the server 120 while saving the changed data in the memory 210 at step 1417. In the case in which the real data is deleted or shrunk in size, the used memory space is reduced and, if this operation is repeated, the used memory space of the memory 210 may become less than a second threshold value (M%). The control unit 200 detects that the used memory space becomes less than the second threshold value (M%) at step 1419 and returns the procedure to step 1115 of FIG. 11. In this case, the control unit 200 is capable of downloading the real data corresponding to the meta information processed in the meta only on mode; and, once the real data are downloaded to be stored in the memory 210, the control unit 200 displays the meta information without the meta only on mode indicator icon as shown on the screen denoted by reference number 719 of FIG. 7.

As described with reference to FIGS. 11 to 14, the terminal operating in the meta only off mode synchronizes the meta information and real data with the copies saved in the server 120 at the initial synchronization step and then switches between the meta only off mode and the meta only on mode according to the used memory space of the memory 210.

In the meta only off mode, the terminal downloads the meta information from the server to acquire synchronization of the meta information between the terminal and the server and downloads the real data corresponding to the meta information in sequence at the initial synchronization step. At this step, the terminal as a client is capable of acquiring synchronization of the meta information and the real data with the copies saved in the server. If a piece of meta information is selected in the state in which the initial synchronization has been acquired, the terminal checks the memory 210. At this time, if the used memory space is not greater than the first threshold (N%), the terminal downloads the real data corresponding to the selected meta information and stores the downloaded data in the memory 210. Otherwise, if the used memory space is greater than the first threshold, the terminal displays an alarm message (e.g. popup message) and stops storing the downloaded real data (i.e. switches the operation mode to the meta only on mode). If the used memory space decreases to reach the second threshold (M%) while operating in the meta only off mode, the terminal switches the meta only on mode to the meta only off mode again.

According to an exemplary embodiment of the present invention, the first and second threshold values are used for analyzing the used memory space of the memory 210 (i.e., the memory region set for storing the cloud data in the meta only off mode). As an example, the first threshold (N%) is used as a criterion for switching from the meta only off mode to the meta only on mode, and the second threshold (M%) is used as a criterion for switching from the meta only on mode to the meta only off mode, the first threshold being greater than the second threshold. However, it is possible to use only one threshold value. In this case, the terminal can be configured to operate, if the used memory space is greater than the threshold value, in the meta only on mode and, otherwise, in the meta only off mode.

According to an exemplary embodiment of the present invention, the terminal operating in the meta only on mode or meta only off mode is capable of modifying the real data saved in the server 110. For example, the terminal can be configured to have the capability of only playing/displaying the real data or the capability of deleting or modifying the real data (e.g., adding new data to the real data or deleting a part of the real data). In this case, it is necessary to acquire synchronization of the meta information and real data between the terminal and the server. In the case that the real data is modified in the terminal, it may be necessary to update the corresponding copy of the modified real data in the server or not. In the former case, if the real data is modified (or deleted) in the terminal, the terminal uploads the meta information and/or the real data of the modified (deleted) data to the server to synchronize the meta information and/or the real data with the copies saved in the server. In the latter, however, if it is intended to modify the real data only in the terminal (i.e., the real data corresponding to the currently selected meta information is intended to be modified locally, e.g., the user may change the resolution of an exif picture without upload), the terminal is capable of deleting the real data modified after it has been consumed (displayed/processed).

As described above, the data sharing method of exemplary embodiments of the present invention characterized in that the terminal switches its operation mode between the meta data only on mode and the meta data only off mode in processing the real data with the meta information such that the cloud service can be provided in the operation mode as intended by the user. The meta data only on mode is advantageous for providing the cloud service to the low end and/or low capacity terminals. According to an exemplary embodiment of the present invention, the terminal operating in the meta data only on mode loads, when a piece of meta information of the real data of the selected data type is selected, the real data on to the cache region temporarily and formats the cached region after completing the use of the real data to secure the space for processing other data. In the case of the terminal having no space enough for the device cache region, it is possible to use an external memory card for securing the execution space. As describe above, the cloud service method of exemplary embodiments of the present invention is capable of managing the contents using the meta information on behalf of the real data of the contents, resulting in minimization of the gap with the cloud service (single view is supported—data saved in the cloud server data and terminal are identical with each other).

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:
1. A portable communication device comprising:
a transceiver;
at least one processor; and
at least one memory configured to store one or more computer programs, including instructions, configured to be executed by the at least one processor, the one or more computer programs including instructions to at least:
receive an image indicative of an electronic document executable in a specified application from a cloud server capable of providing a cloud service, the electronic document previously being uploaded to the cloud server from an external electronic device,
present the image via a display operatively coupled with the at least one processor,
identify an input received with respect to the image,
receive, via the transceiver, at least one portion of the electronic document from the cloud server based at least in part on the identifying of the input,
present the at least one portion of the electronic document received from the cloud server at the portable communication device,
based at least in part on a determination that the at least one portion of the electronic document is modified via the specified application, upload the at least one portion of the electronic document as modified to the cloud server such that the electronic document stored in the cloud server is changed according to the modification, and remove the at least one portion of the electronic document from the portable communication device based at least in part on terminating the presenting of the at least one portion of the electronic document, wherein the at least one portion of the electronic document is removed without receiving a user input after the presenting is terminated.

2. The portable communication device of claim 1, wherein the one or more computer programs further include instructions to at least:

display, as at least part of the presenting of the image, an indication indicating that the electronic document is stored at the cloud server.

3. The portable communication device of claim 1, wherein the one or more computer programs further include instructions to at least:

store the at least one portion of the electronic document in a cache while at least part of the at least one portion of the electronic document is presented.

4. The portable communication device 1, wherein the one or more computer programs further include instructions to at least:

perform the removing based at least in part on a determination that a data type of the electronic document corresponds to a specified data type specified by a user.

5. The portable communication device of claim 1, wherein the one or more computer programs further include instructions to at least:

remove the at least one portion of the electronic document from the portable communication device based at least in part on a determination that an amount of a remaining available space of the at least one memory satisfies a specified amount.

6. A non-transitory machine-readable storage device storing instructions that, when executed by one or more processors, cause the one or more processors to perform operations comprising:

obtaining, at an electronic device, an image indicative of an electronic document executable in a specified application from a cloud server capable of providing a cloud service, the electronic document being previously uploaded to the cloud server from an external electronic device;

presenting the image via a display operatively coupled with the electronic device;

identifying an input received with respect to the image;

receiving at least one portion of the electronic document from the cloud server based at least in part on the identifying of the input;

presenting the at least one portion of the electronic document received from the cloud server at the electronic device;

uploading, based at least in part on a determination that the at least one portion of the electronic document is modified via the specified application, the at least one portion of the electronic document as modified to the cloud server such that the electronic document stored in the cloud server is changed according to the modification; and removing the at least one portion of the electronic document from the portable communication device based at least in part on terminating the presenting of the at least one portion of the electronic document, wherein the at least one portion of the electronic document is removed without receiving a user input after the presenting is terminated.

7. A portable communication device comprising:

a memory;

a transceiver configured to support a wireless communication; and a processor adapted to:

receive an image indicative of an electronic document from a cloud server, the electronic document being previously uploaded to the cloud server from an external electronic device, present the image via a display operatively coupled with the processor, identify an input received with respect to the image, receive, via the wireless communication, at least one portion of the electronic document from the cloud server based at least in part on the identifying of the input, present at least part of the at least one portion of the electronic document received from the cloud server at the portable communication device, upload, based at least in part on a determination that the at least one portion of the electronic document is modified via the specified application, the at least one portion of the electronic document as modified to the cloud server such that the at least one portion of the electronic document stored in the cloud server is to be synchronized according to the modification, and remove, without additional user input, the at least one portion of the electronic document from the portable communication device based at least in part on a determination that the presenting of the at least part of the at least one portion of the electronic document is terminated.

8. The portable communication device 7, wherein the processor is adapted to: perform the removing based at least in part on a determination that a data type of the electronic document corresponds to a specified data type specified by a user.

9. The portable communication device 7, wherein the processor is adapted to: remove the at least one portion of the electronic document from the portable communication device based at least in part on a determination that an amount of a remaining available space of the memory satisfies a specified amount.

10. The method of claim 7, wherein the presenting of the image comprises displaying an indication indicating that the electronic document is stored at the cloud server.

11. The method of claim 7, further comprising:

storing the at least one portion of the electronic document in a cache while at least part of the at least one portion of the electronic document is presented.

12. The portable communication device of claim 7, wherein the processor is further adapted to:

perform the receiving of the image based at least in part on generating of the content at the external electronic device.

* * * * *